United States Patent [19]

Henderson

[11] 4,094,734
[45] June 13, 1978

[54] EVAPORATOR AND TREATMENT OF VISCOUS BRINES

[75] Inventor: George L. Henderson, Seattle, Wash.

[73] Assignee: Henderson Industrial Corporation, Seattle, Wash.

[21] Appl. No.: 406,635

[22] Filed: Oct. 15, 1973

[51] Int. Cl.² .............................................. B01D 1/22
[52] U.S. Cl. .................................... 159/13 A; 159/49; 202/236
[58] Field of Search ................. 159/13 R, 13 A, 13 B, 159/13 C, 28 VH, 28 S, 28 R, 43, 49, 1 A, 24 R; 202/236; 203/89, 11; 165/115, 118, 100, 101, 139, 146, 147, 158, 173, 174, 110

[56] References Cited

U.S. PATENT DOCUMENTS

| 485,315 | 11/1892 | Yaryan | 159/26 R |
|---|---|---|---|
| 780,612 | 1/1905 | Meyer | 159/13 A |
| 2,423,997 | 7/1947 | Ruegg | 126/109 |
| 2,753,932 | 7/1956 | Eckstrom et al. | 159/13 A |
| 2,764,233 | 9/1956 | Skinner | 159/13 A |
| 2,896,426 | 7/1959 | Ayling | 165/110 |
| 3,175,962 | 3/1965 | Holtslag | 159/13 A X |
| 3,244,601 | 4/1966 | Diedrich | 159/24 R |
| 3,356,125 | 12/1967 | Standiford, Jr. | 159/49 |
| 3,568,766 | 3/1971 | Thomas | 159/28 R |
| 3,741,879 | 6/1973 | Best, Jr. | 159/13 B |

FOREIGN PATENT DOCUMENTS

| 202,722 | 7/1956 | Australia | 159/13 A |

Primary Examiner—Norman Yudkoff
Attorney, Agent, or Firm—Dressler, Goldsmith, Clement, Gordon & Shore, Ltd.

[57] ABSTRACT

Viscous brines or other viscous solutions are evaporated in a falling film evaporator in which a header having a plurality of distributor arms supplying rapidly moving solution to feed tubes is formed with a graduated cross section and the feed tubes have a total cross-sectional area substantially equal to the cross section of the line through which the viscous solution is pumped so that a substantially constant velocity is maintained throughout the header. To employ a tubular evaporator, the viscous solution from the feed tubes is spread out on a conical distributor positioned at the upper end of each evaporator tube to deposit a film of solution on the interior of these tubes.

10 Claims, 7 Drawing Figures

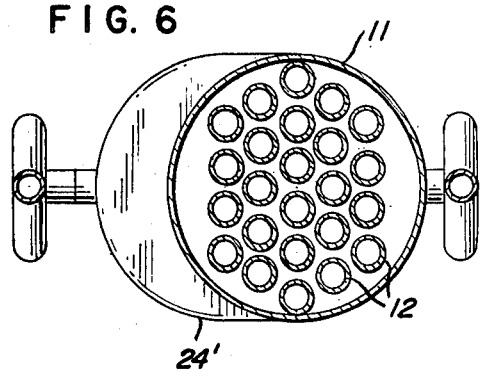
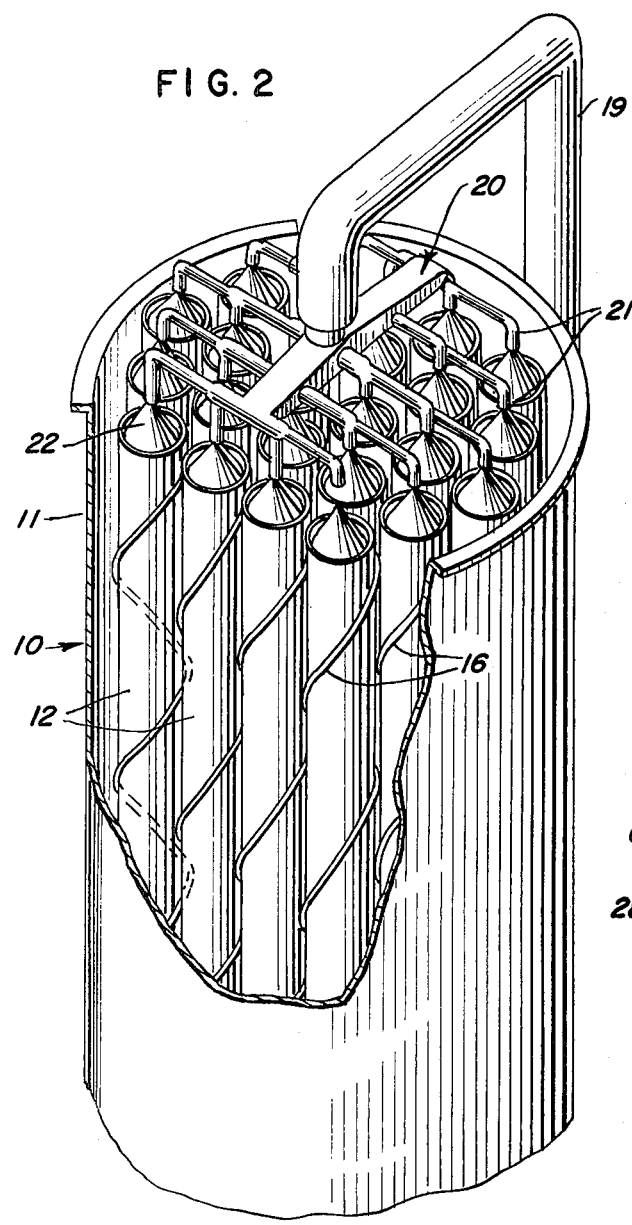
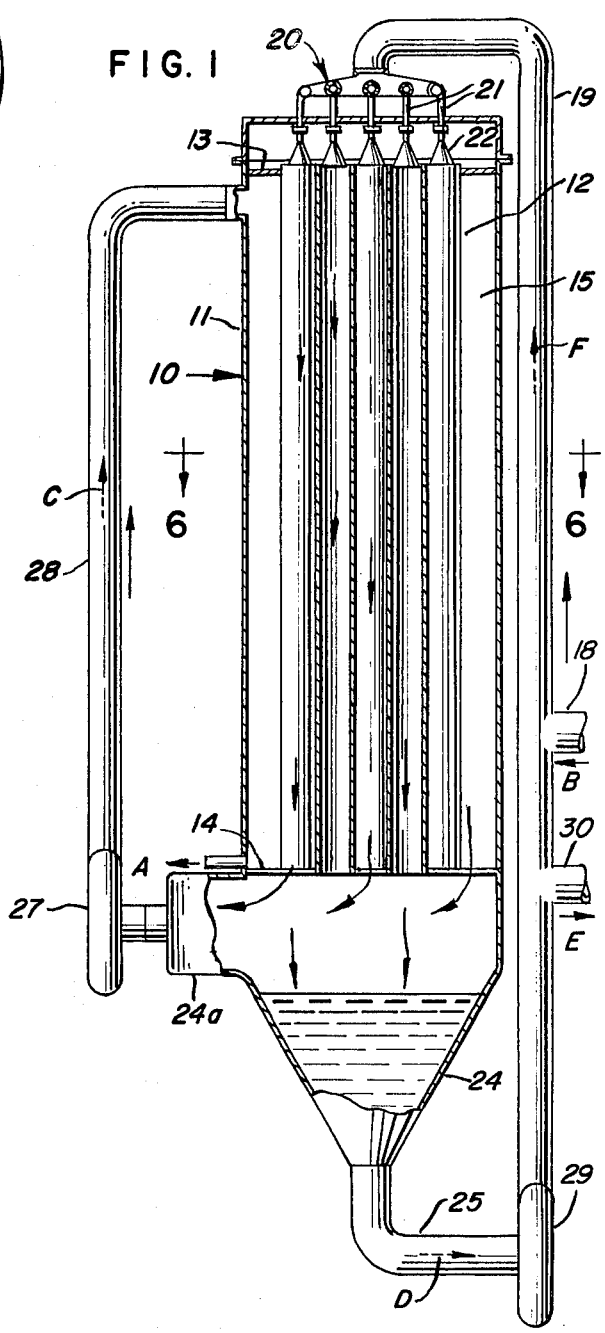
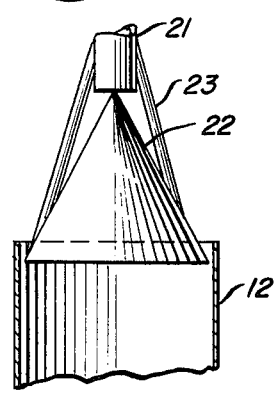

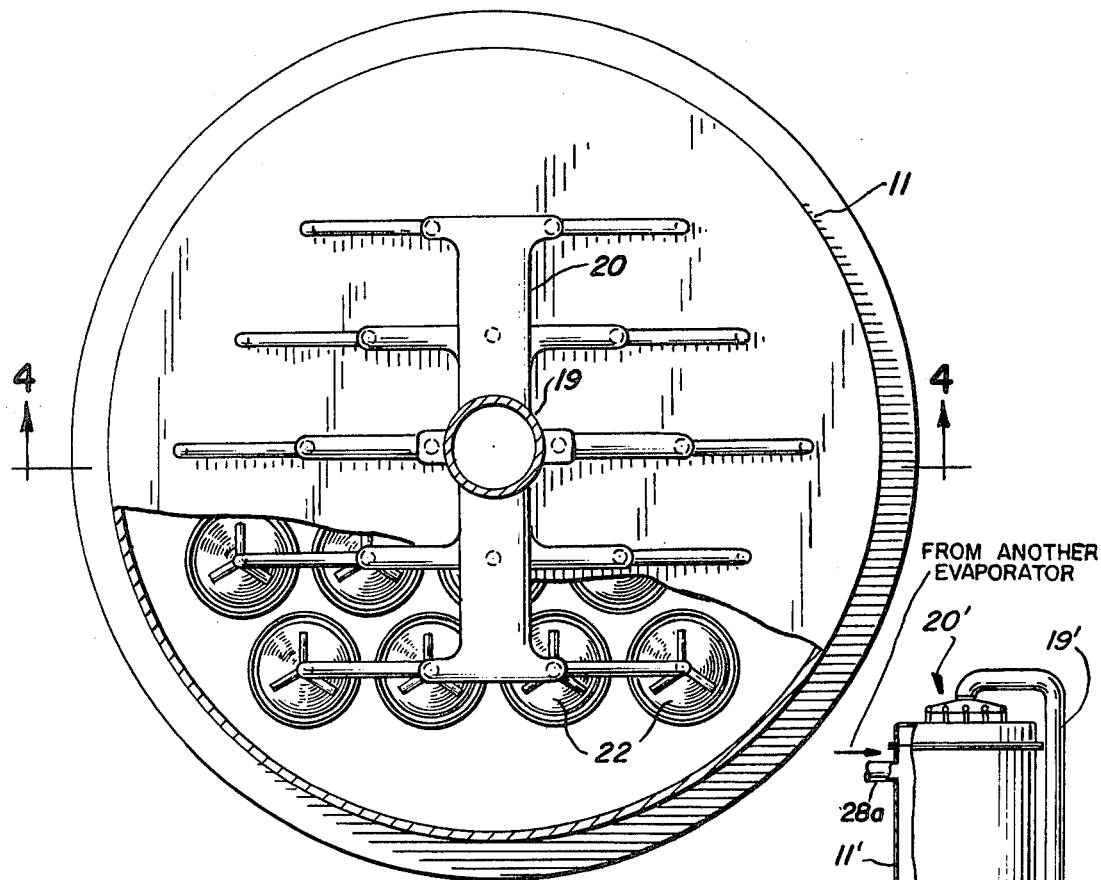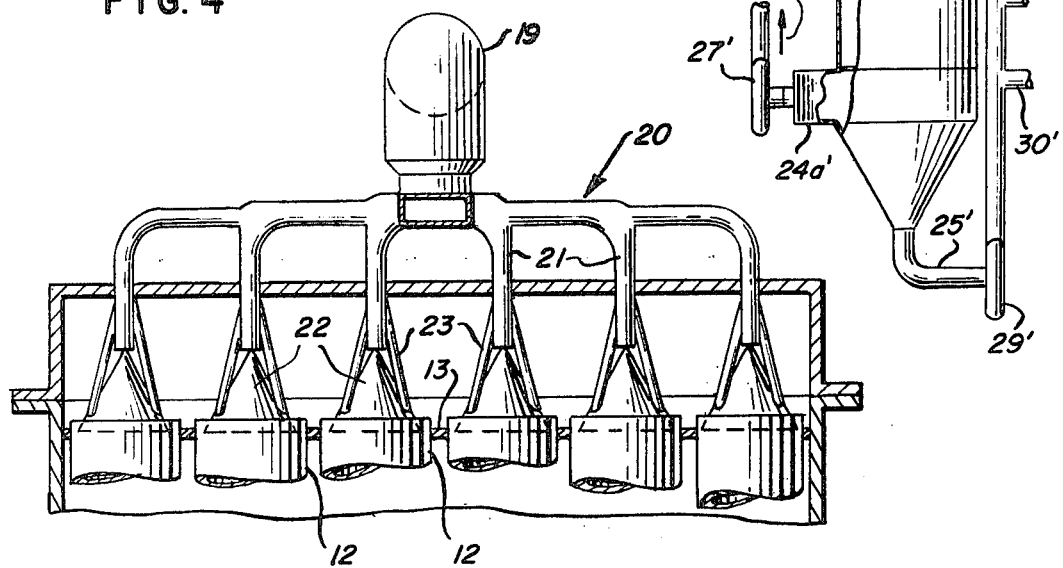

EVAPORATOR AND TREATMENT OF VISCOUS BRINES

The present invention relates to an improved evaporator and to an improved system for handling viscous liquids to be evaporated. In its aspect of broadest applicability, the invention relates to an improved falling brine evaporator adapted to handle more viscous brines to thereby enable the evaporation of additional water from a viscous brine which contains suspended salt solids. In this way, a greater proportion of water is efficiently removed by evaporation at atmospheric pressure. The more concentrated brine slurry so-provided can be treated as waste or further concentrated, in which case the burden of removing the remaining water by evaporation at reduced pressure is eased.

In my U.S. Pat. No. 3,414,483, I described the advantage of evaporating brine at atmospheric pressure with the brine falling rapidly in the form of a flowing film on a vertically disposed heat transfer wall and I pointed out how efficiencies of between about 10 and about 30 pounds of water per hour per square foot of heat transfer wall could be obtained using steam condensing as a thin film on the opposite side of the heat transfer wall, this steam being only about 3° F. to about 15° F. hotter than the brine being evaporated. In this invention, it is desired to extend the utilization of atmospheric evaporation as described in said prior patent so that a greater portion of the water contained in the original sea water could be removed using these prior teachings providing a more concentrated brine.

In my U.S. Pat. No. 3,586,090, I described the evaporation of water from brine at atmospheric pressure until a substantial amount of dissolved salt had been precipitated followed by transfer of the saturated brine to a reduced pressure flashing zone to evaporate additional liquid which precipitates additional dissolved salt therefrom. In this patent I point out that the amount of precipitation in the atmospheric evaporation step should be limited so that the slurry obtained is not higher than about 150 centipoises since it is difficult to handle slurries of greater viscosity.

This invention is concerned with the problem of handling high viscosity slurries in an atmospheric evaporator so as to increase the proportion of water which can be removed at atmospheric pressure. This is of value regardless of whether the more concentrated brine is regarded as waste or is further processed at reduced pressure.

Also, and in my prior teachings, the utilization of flat walled structures was emphasized because, and as pointed out in my U.S. Pat. No. 3,586,090, when the brine being treated has an initial downward velocity, the liquid entering a tubular channel at high velocity forms eddy currents which erode, and eventually cut through the tube. In the present development, I have found that with appropriate distribution of the slurry being evaporated, slurries can be handled at high velocity without fouling a header structure used to distribute the brine slurry to a plurality of tubular heat transfer surfaces and that the slurry brine can be deposited on the interior of a tubular channel in the form of a thin film while minimizing the formation of erosive eddy currents.

It will be understood that this invention is primarily concerned with the evaporation of water from sea water in order to produce fresh water as a product, salt being another product of optional significance. However, the invention is also applicable to the atmospheric concentration by evaporation of any aqueous or non-aqueous liquid containing dissolved solids, especially where concentration is to continue to produce a liquid slurry of high viscosity. Accordingly, while the removal of water from brine with the precipitation of salt is the primary contemplation, and will be referred to for ease of discussion, it will be understood that the invention has broader application as indicated.

The invention will be more fully understood from the description which follows, taken in conjunction with the accompanying drawings, in which:

FIG. 1 is a simplified elevation, partly in section, and showing a brine evaporator constructed in accordance with one aspect of the invention;

FIG. 2 is a perspective of the upper portion of the brine evaporator, enlarged and partially opened to show its interior structure;

FIG. 3 is a further enlarged plan view showing the slurry distributing header overlying the evaporator shell, the shell being partially opened to show some of the tubes and associated conical distributors so that the relationship therebetween will be evident;

FIG. 4 is a fragmentary cross section taken on the plane 4—4 of FIG. 3 to show some of the details of the construction of the header;

FIG. 5 is an enlarged fragmentary view showing the details of the slurry distributor;

FIG. 6 is a cross section taken on the plane 6—6 of FIG. 1; and

FIG. 7 is a reduced scale simplified elevation, partly in section showing a brine evaporator having an alternate source of feed brine and an alternate disposition of concentrated product from that shown in FIG. 1.

Referring more particularly to FIGS. 1 and 2, the brine evaporator is identified generically by the numeral 10, and it includes a cylindrical shell 11 which is vertically disposed, the shell 11 includes a bundle of parallel tubes 12, only a few of which are shown in FIG. 1 for ease of presentation. The ends of the parallel tubes 12 are expanded into upper and lower tube sheets 13 (omitted in FIG. 2 for clarity) and 14 in order to form a steam chamber 15 which is closed at its upper end. Steam which is at a slightly higher temperature than the brine to be evaporated contacts the exterior of the tubes 12 in order to heat the same. The lower sheet 14 forms a pressure tight seal between the steam side and the brine side of the heat transfer surfaces.

As can be seen in FIG. 2 (although omitted for clarity in FIG. 1), each of the tubes 12 is encircled by a helical trap or gutter 16 which extends from the upper end of each tube to the lower end of each tube. As will be apparent, the steam within the chamber 15 will condense on the outer walls of the tubes 12 and be collected within the helical traps 16. At their lower end, the traps 16 deposit the collected condensate which is removed from the brine evaporator 10 as indicated by arrow A.

As will be understood, the water condensate A may be the primary product of the brine evaporator.

A concentrated brine is supplied to the brine evaporator via line 18, the brine feed being further identified by arrow B. As can be seen, the incoming brine concentrate B is admixed with more concentrated brine circulating through the brine evaporator 10 in line 19, this resulting mixture being pumped at high velocity to the upper end of the brine evaporator 10 where the brine is distributed to the various tubes 12 by means of a distributor indicated generally by the numeral 20, and which includes a plurality of feed tubes 21 so that each of the tubes 12 is directly supplied with a rapidly moving stream of concentrated brine, this rapidly moving stream of brine being distributed to the interior surface of the tubes 12 by means of conical distributors 22 which are carried, in the manner of a spider, by supports 23 (as shown in FIG. 5). In this way, a rapidly downward moving film of brine is formed on the interior of the tubes 12 where it can be heated by the heat transmitted to the tubes by the steam in the chamber 15.

The bundle of tubes 12 is sealed at its upper and lower ends in sheets 13 and 14, respectively, in a steam-tight manner. The lower ends of the tubes 12 are open, as shown, so that the steam generated by evaporation of water from the film of brine within the tube 12 is free to enter the cone-shaped casing 24 at the lower end of the evaporator 10. As will be evident, the brine settles to the bottom of the cone-shaped casing 24 where it communicates with line 25 and the steam remains at the upper end of the chamber 24 where it is withdrawn via apron section 24' (shown in FIG. 6) and compressed by compressor 27 (and thereby heated), and returned to the upper end of chamber 15 via line 28, the returning steam being identified by arrow C.

The collected concentrated brine at the bottom of the cone-shaped casing 24 is pumped away via line 25 and pump 29, and is then passed upwardly through line 19.

A portion of the collected concentrated brine is removed via line 30, this highly concentrated brine being identified by arrow E. The remaining highly concentrated brine is then mixed with the less concentrated brine input B to form a mixture F which is recirculated to the brine distributor 20 at the upper end of the evaporator 10.

To summarize the operation of the apparatus of FIGS. 1 through 6, the brine mixture F runs down the interior of tubes 12 in the form of a rapidly moving film, the exterior of the tubes being heated by the steam C in chamber 15. All of the steam C condenses and is collected in traps 16 and withdrawn from the system as condensate A. The steam generated within the tubes 12 by the evaporation of water from the brine F moves downwardly to casing 24 where it is compressed by compressor 27 and recirculated as C. The concentrated brine collects at the bottom of casing 24 where it is recirculated, a portion being withdrawn as E for further treatment or disposal and fresh brine being added to again provide the brine mixture F which is recirculated.

As one illustration of actual practice, brine at substantially its atmospheric pressure boiling point is supplied at B at the rate of 5056 pounds per hour, this feed B containing 9% solids. 2275 pounds per hour of a more concentrated brine containing 18% solids is withdrawn at E and 2278 pounds per hour of condensate are withdrawn at A. The mixed brine is recirculated at the rate of 1000 gallons per minute, the steam moves downwardly within chamber 15 at a rate of about three feet per second, and the steam generated within the tubes 12 moves downwardly at a rate of about 1.5 feet per second. Steam is drawn out of the casing 24 at the rate of 19.66 cubic feet per second.

It has been found, using a tube bundle containing 24 tubes, each being 15 feet long and 10 inches in diameter, that approximately 200 pounds of brine must be circulated through pump 29 in order that 1 pound of water be removed as condensate A.

In the alternate embodiment of FIG. 7, the elements similar to those of the embodiment of FIG. 1 bear similar numbers, except each number is "primed." In this embodiment, the steam discharged from apron 24a' is not recompressed for recycle to the upper portion of the evaporator but is rather recompressed for feed to another evaporator operating in series or in parallel to the evaporator shown. Similarly, the steam introduced through line 28a is steam that is recompressed after discharge from another evaporator operating in series or in parallel to the evaporator shown.

It is desired to emphasize that the structures shown in the Figures require that the concentrated brine removed from the lower casing 24 be supplied to the upper end of each of tubes 12 in the form of a rapidly moving stream which is spread and deposited in the form of a film on the interior of the tubes by means of the conical distributor 22. This means that the pump 29 must move the concentrated brine through the line 19 at a considerable velocity, generally in excess of about 8 feet per second. The rapidly moving slurry in line 19 must now be subdivided into a plurality of rapidly moving streams, one for each of the feed tubes 21, there being one feed tube for each of the tubes 12. This requires a header of special construction since, in the absence of an appropriate header, the solids contained in the viscous brine will settle out and choke portions of the header, significantly diminishing the efficiency of the evaporator and providing considerable difficulty in the repair and maintenance of the system.

The header 20 is more fully shown in FIGS. 2, 3 and 4 where it will be seen that the line 19 terminates in a header structure providing one feed tube 21 for each of the tubes 12. As can be seen in FIGS. 2 and 3 there are 24 of the feed tubes 21, and there are also 24 tubes 12, though only four of these are shown in FIG. 3 to simplify the drawing. As can be seen, there are conical distributors 22 for each tube 12, the distributors 22 being carried by the feed tubes 21 via the spider supports 23.

In order to avoid difficulty in the header 20 as a result of the high viscosity and high solids content of the liquids which are intended to be conveyed therethrough, it is appropriate that the cross-sectional area of the line 19 be substantially the sum of the cross-sectional areas of each of the tubes 21 and, as will be seen from the drawings, the distributing conduits are reduced in cross section so that the velocity of the slurry moving through the line 19 and thence through the various distributing conduits will be a constant. As will be appreciated, this represents a progressive reduction in cross section, as shown.

As shown in FIGS. 2, 3 and 4, conduit 29 is connected to manifold 31, to which distributor arms 32 are connected, each of which leads to a plurality of tubes 21. Manifold 31 is dimensioned to provide a decreasing cross section of greater distances from line 19 to compensate for the liquid drawn off to the distributor arms along its path. Similarly, each distributor arm 31 is reduced in cross section at shoulders 33 to compensate for the liquid drawn off to the successive conduits 21 along its path.

By progressive reduction in the size of the distributor arms and by communicating these between a feed line 19 and a plurality of feed tubes 21 which have a total cross section the same as the feed line, it is possible to maintain a substantially constant velocity and thereby eliminate dead spots and the resulting congestion and fouling of the header structure 20.

Referring now to FIGS. 2, 3 and 5, it will be seen that the feed tube 21 overlies a conical element which desirably has an included angle of about 60°. The slurry issues downwardly from the lower end of feed tube 21 at a constant velocity and this stream of viscous liquid is spread over the conical distributor 22 which is secured to the feed tube 21 by means of the spider supports 23, only one of which is shown. As the cone enlarges towards its base, the stream thins out and is deposited on the interior of the tube 12 in the form of a thin film. Using a feed tube having an interior diameter of 1½ inches, and a distribution cone having an included angle of 60° with 10 inch diameter heat transfer tubes, and utilizing a hot brine containing between 9% and 18% solids, traveling at a velocity in excess of 8 feet per second, it is feasible to establish a flowing film on the inside of the heat transfer tubes having a thickness of 0.050 inch. With such a heat transfer tube, it is appropriate to mount the helical condensate trap or gutter so that the pitch of the helix will be 24 inches along the length of the tube.

As should now be evident, the brine evaporator disclosed herein is capable of handling hot brines at atmospheric pressure and which contain more than about 9% by weight of precipitated solids. Thus, the brine evaporator is capable of functioning with liquids which have a viscosity in excess of 150 centipoises. While the brine evaporator disclosed herein can be used with aqueous or non-aqueous liquids of lower viscosity, it will be appreciated that the evaporator is most beneficially employed with liquids of higher viscosity where other evaporators are not capable of handling the situation with equal efficiency.

The invention is defined in the claims which follow.

I claim:

1. An evaporator for concentrating a liquid comprising: a vertically disposed shell, a bundle of parallel open-ended tubes vertically disposed within said shell, said tubes being sealed to a tube sheet at their upper and lower ends to define a steam chamber for heating said tubes, said tubes carrying trap means on the exterior thereof for receiving condensate and for removing the same from said steam chamber, a lower casing positioned beneath said tubes to receive steam and liquid concentrate from said tubes, means in said lower casing for separating said liquid concentrate from said steam, means to withdraw said steam from said lower casing, means to supply heated steam to the upper end of said steam chamber, means to withdraw said liquid concentrate from said lower casing and to pump the same at high velocity through a pipeline toward said tubes at the upper end thereof, header means including distributor arms to distribute the said liquid concentrate to a plurality of feed tubes, one for each of said open-ended tubes, said distributor arms having a graduated internal cross section and said feed tubes having a total internal cross-sectional area substantially equal to the internal cross section of the line through which said liquid concentrate is pumped to maintain the velocity substantially constant throughout said header means.

2. An evaporator as recited in claim 1 in which means are provided for heating the steam withdrawn from said lower casing and for returning the heated steam to the upper end of said steam chamber as said supplied heated steam.

3. An evaporator as recited in claim 2 in which said means to heat the steam withdrawn from said lower casing is a compressor.

4. An evaporator as recited in claim 1 in which said means to supply heated steam is connected to another evaporator.

5. An evaporator as recited in claim 1 in which said means to withdraw said steam from said lower casing is connected to another evaporator.

6. An evaporator as recited in claim 1 in which means are provided to remove a portion of the concentrate withdrawn from said lower casing and means are provided to introduce fresh liquid to the concentrate which is pumped to the upper end of said tubes.

7. A brine evaporator for concentrating a brine containing precipitated salt and having a viscosity in excess of 150 centipoises comprising: a vertically disposed shell, a bundle of parallel open-ended tubes vertically disposed within said shell, said tubes being sealed to a tube sheet at their upper and lower ends to define a steam chamber for heating said tubes, said tubes carrying trap means on the exterior thereof for receiving condensate and for removing the same from said steam chamber, a lower casing positioned beneath said tubes to receive steam and concentrated brine from said tubes, means in said lower casing for separating said concentrated brine from said steam, means to withdraw said steam from said lower casing and to heat and return the heated steam to the upper end of said steam chamber, means to withdraw said concentrated brine from said lower casing and to pump the same at high velocity through a pipeline toward said tubes at the upper end thereof, header means including distributor arms to distribute the said concentrated brine to a plurality of feed tubes in the form of rapidly moving streams, one for each of said open-ended tubes, said distrubutor arms having a graduated internal cross section and said feed tubes having a total internal cross-sectional area substantially equal to the internal cross section of the line through which said concentrated brine is pumped to maintain the velocity substantially constant throughout said header means, and means including a conical distributor positioned at the upper end of said tubes for spreading said rapidly moving streams and depositing the same in the form of a film on the interior of said tubes.

8. An evaporator as recited in claim 7 in which means are provided for removing from the system a portion of the concentrated brine withdrawn from said lower casing and means are provided for adding fresh brine of lower salt concentration to said concentrated brine before the brine reaches said header.

9. In an evaporator for concentrating a liquid having a viscosity of at least 150 centipoises and which includes a plurality of heat transfer surfaces and feed tubes for supplying said liquid thereto in the form of a rapidly moving stream, the improvement comprising means to pump said liquid at high velocity through a line to a header including distributor arms to distribute the said liquid to said plurality of feed tubes, said distributor arms having a graduated internal cross section and said feed tubes having a total internal cross-sectional area substantially equal to the internal cross section of the line through which said liquid is pumped to maintain the velocity substantially constant throughout said header.

10. A method of concentrating a liquid having a viscosity of at least 150 centipoises comprising pumping said liquid through a line at a velocity of at least about 8 feet per second to the upper end of a bundle of parallel, open-ended, externally steam heated, heat exchange tubes, subdividing the brine flowing in said line to form a plurality of downwardly flowing rapidly moving streams, spreading each of said streams over an upright cone positioned at the upper each of each of said tubes so that a downwardly flowing tubular film is formed on said cones, the lower ends of said cones being positioned within the upper ends of said tubes to cause the downwardly flowing tubular films to be deposited on the interiors of said tubes.

* * * * *